United States Patent
Wynn et al.

(10) Patent No.: US 10,886,507 B2
(45) Date of Patent: Jan. 5, 2021

(54) BATTERY PACK WITH LAMINATES TO REDUCE IMPACT OF SIDE RUPTURE AND METHOD OF MANUFACTURING SAME

(71) Applicant: Rivian IP Holdings, LLC, Plymouth, MI (US)

(72) Inventors: Nathaniel Christopher Wynn, Newport Beach, CA (US); Charles Ed Chang, Coto de Caza, CA (US); Emil Yu-ming Chao, Studio City, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 201 days.

(21) Appl. No.: 16/009,268

(22) Filed: Jun. 15, 2018

(65) Prior Publication Data
US 2019/0386264 A1    Dec. 19, 2019

(51) Int. Cl.
| H01M 2/10 | (2006.01) |
| H01M 2/02 | (2006.01) |
| H01M 2/16 | (2006.01) |

(52) U.S. Cl.
CPC ....... *H01M 2/1016* (2013.01); *H01M 2/0267* (2013.01); *H01M 2/0287* (2013.01); *H01M 2/16* (2013.01)

(58) Field of Classification Search
CPC ............ H01M 2/1016; H01M 2/0267; H01M 2/0287; H01M 2/16; H01M 2220/20; H01M 2/1094; H01M 2/105; H01M 2/1077; B31D 3/0261; B32B 3/12
USPC .......................................................... 429/99
See application file for complete search history.

(56) References Cited

U.S. PATENT DOCUMENTS

| 6,592,963 B1 | 7/2003 | Levit |
| 9,793,530 B2 | 10/2017 | Wintner |
| 2017/0047572 A1 | 2/2017 | Biskup et al. |
| 2017/0271643 A1 | 9/2017 | Wintner |
| 2018/0013102 A1* | 1/2018 | Iizuka .................. H01M 2/0285 |

FOREIGN PATENT DOCUMENTS

| CN | 107658393 | 2/2018 |
| EP | 0009064 | 9/1983 |

OTHER PUBLICATIONS

Partial International Search Report for International Application PCT/US2019/037306, dated Oct. 14, 2019.

\* cited by examiner

*Primary Examiner* — Gary D Harris
(74) *Attorney, Agent, or Firm* — Clements Bernard Walker; Robert R. Richardson

(57) ABSTRACT

A separating member for separating a plurality of battery cells is provided, which includes a plurality of first walls and a plurality of second walls having a thickness larger than a thickness of the first walls. The separating member is expandable from a collapsed state to an expanded state. The separating member has a plate configuration in the collapsed state and has a honeycomb structure in the expanded state. The plurality of first walls and the plurality of second walls jointly define a plurality of cell units of the honeycomb structure.

8 Claims, 5 Drawing Sheets

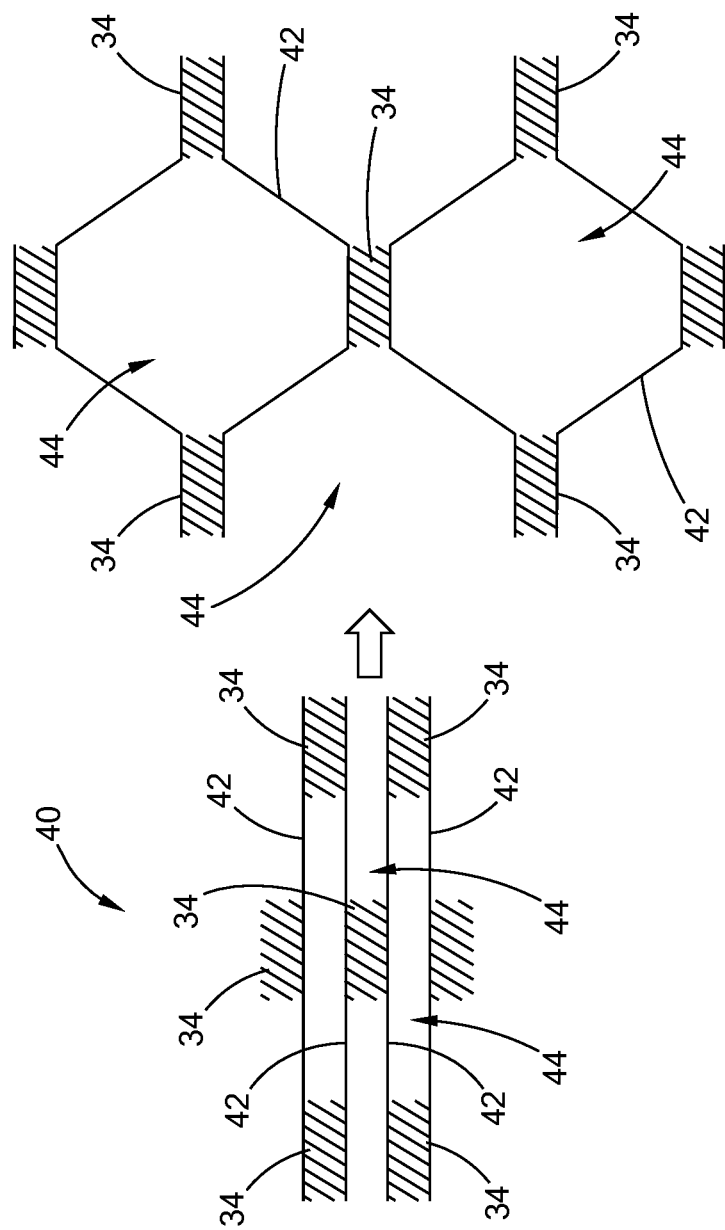

BATTERY PACK WITH LAMINATES TO REDUCE IMPACT OF SIDE RUPTURE AND METHOD OF MANUFACTURING SAME

FIELD

The present disclosure relates generally to battery packs including electrochemical cells, and more particularly to battery packs including separating members for separating individual battery cells and methods of manufacturing same.

BACKGROUND

The statements in this section merely provide background information related to the present disclosure and may not constitute prior art.

As electric vehicle technology continues to evolve, there is a need to provide improved battery systems and modules for such vehicles. A battery module or a battery pack may include a plurality of electrochemical cells that are closely packed in a battery casing.

The closely-packed battery cells need to be carefully managed in order to avoid safety hazard. When one cell is damaged from impact, a thermal runaway process may occur within the cell, developing a rapidly rising pressure. The pressure spike may rupture the sealed internal volume of the cell, potentially leading to fire. If an individual cell within a battery pack overheats or causes a fire, it can cause a similar reaction in adjacent cells.

One method of reducing the risk of a thermal runaway propagation is to provide an air gap between the cells. While air is a good insulator, during a thermal runaway process, several liters of flammable gas may be generated within the cell over the course of a few seconds. The air gap may not be effective in preventing thermal runaway propagation.

Another method of reducing the risk of a thermal runaway propagation is to provide a rupture disc in each cell. The rupture disc as a pressure relief device is provided at an end of the cell to release the internal pressure out of the cell when a specified pressure is reached. However, when a cell ruptures at a side, the internal pressure of the cell and the resulting blowtorch effect are directed sideway toward neighboring cells, resulting in thermal runaway and side rupture of the neighboring cells.

These issues with thermal runaway and side rupture of the battery cells, among other problems, are addressed by the present disclosure.

SUMMARY

In one form, a separating member for separating a plurality of battery cells is provided, which includes a plurality of first walls and a plurality of second walls having a thickness larger than a thickness of the first walls. The separating member is expandable from a collapsed state to an expanded state. The separating member has a plate configuration in the collapsed state and has a honeycomb structure in the expanded state. The plurality of first walls and the plurality of second walls jointly define a plurality of cell units of the honeycomb structure.

In another form, a structure for protecting individual battery cells within a battery pack from thermal runaway is provided, which includes a plurality of walls defining a plurality of cavities for receiving a group of battery cells. Each group is disposed in one cavity. The plurality of walls each include a laminated structure including a core layer and outer layers opposing the core layer. The outer layers include a flame-retardant material having a low dielectric constant.

In still another form, a method of manufacturing a separating member for separating a plurality of battery cells in a battery pack, is provided, which includes: overlaying a plurality of material layers; and applying a plurality of adhesive sections between adjacent ones of the material layers to form a laminated structure. The adhesive sections in each row are spaced apart at a predetermined interval to define a plurality of cavities between the adhesive sections. The separating member is expandable from a collapsed state to an expanded state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 5A is a schematic cross-sectional view of a third laminated structure that makes up the separating member in a collapsed state;

FIG. 5B is a schematic cross-sectional view of a separating member in an expanded state;

Corresponding reference numerals indicate corresponding parts throughout the several views of the drawings.

DETAILED DESCRIPTION

The following description is merely exemplary in nature and is not intended to limit the present disclosure, application, or uses.

Figure 1:
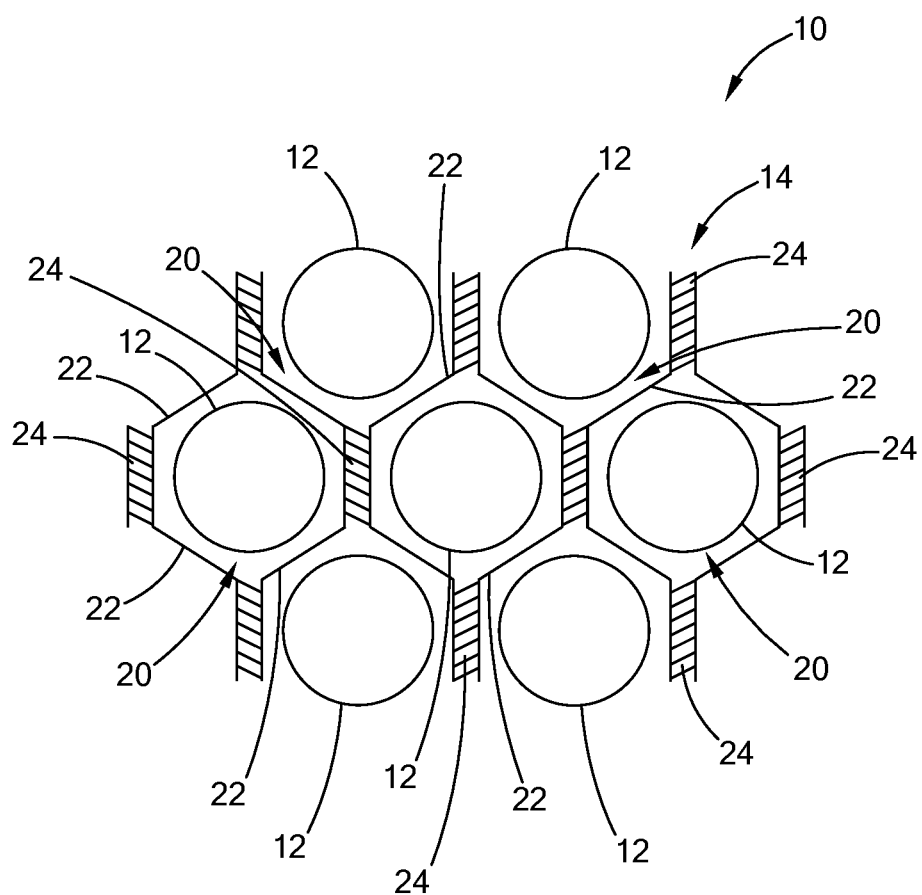
FIG. 1 is a schematic top view of a battery back including a plurality of battery cells and a separating member for separating individual battery cells constructed in accordance with the teachings of the present disclosure.

Referring to FIG. 1, a battery pack 10 constructed in accordance with the teachings of the present disclosure includes a plurality of battery cells 12 and a separating member 14 for separating the plurality of battery cells 12. The plurality of battery cells 12 are arranged to form in an array. Each of the battery cells 12 has a cylindrical configuration. As an example, the battery cells 12 may be arranged to form a close-hexagonal packed array, where alternating rows of battery cells 12 overlie one another. It is understood that the battery cells 12 may be packed to have any arrangement without departing from the scope of the present disclosure. Each of battery cells 12 includes a positive terminal and a negative terminal.

The separating member 14 has a generally honeycomb structure and includes a plurality of first walls 22 and a plurality of second walls 24, which jointly define a plurality of cavities 20 for receiving the individual battery cells 12. Each of the cavities 20 may have a substantially hexagonal shape. The plurality of first and second walls 22, 24 have substantially coplanar ends. The plurality of second walls 24 have a thickness larger than the thickness of the first walls 22.

For example, each cavity 20 may be defined by four first walls 22 and two second walls 24 with the second walls 24 opposing each other and parallel to each other. Therefore, the honeycomb structure of the separating member 14 includes a plurality of unit cells each being formed jointly by the first and second walls 22, 24. The adjacent two of the first walls 22 are connected by one second wall 24 to define a substantial Y shape with an angle of approximately 120° between the first wall 22 and the second wall 24 and between the two adjacent first walls 22. The second walls 24 in the honeycomb structure of the separating member 14 are either aligned or parallel to each other. Each of the first walls 22 includes a first laminate 26 (shown in FIG. 2) and each of the second walls 24 includes a second laminate 28 (shown in FIG. 3).

Figure 2:
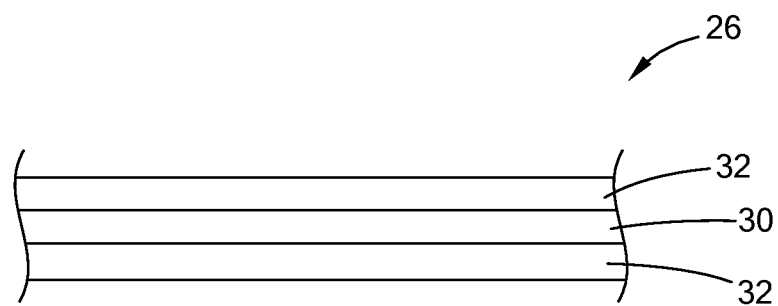
FIG. 2 is a cross-sectional view of a first laminate that forms a part of the separating member constructed in accordance with the teachings of the present disclosure.
Figure 3:
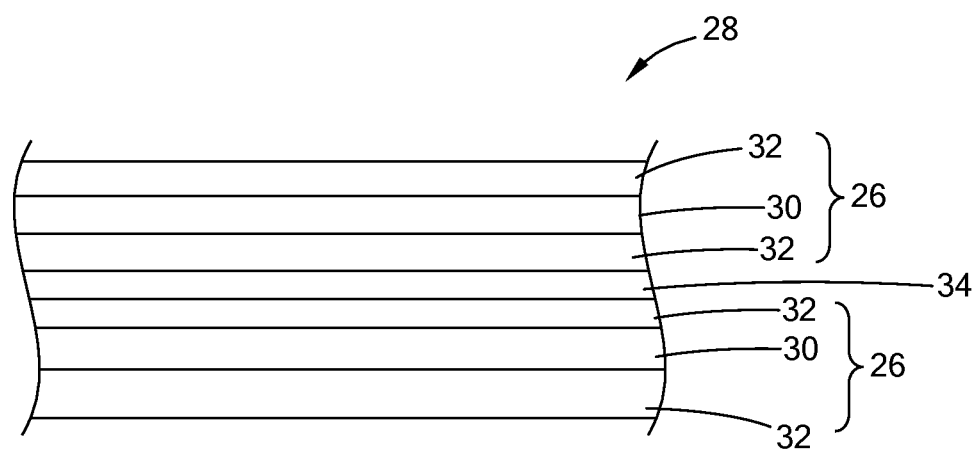
FIG. 3 is a cross-sectional view of a second laminate that forms another part of the separating member constructed in accordance with the teachings of the present disclosure.

Referring to FIGS. 2 and 3, the first and second laminates 26 and 28 are substantially non-conductive, non-porous laminated structures and include a flame-retardant material having a low dielectric constant. The first laminate 26 includes a core layer 30 and a pair of outer layers 32 on opposing surfaces of the core layer 30. The core layer 30 provides the structural strength for the first laminate 26, whereas the outer layers 32 provide protection for the core layer 30 against heat.

As an example, the core layer 30 may be a metal layer having a high melting point and high strength, such as steel, and the outer layers 32 may include a material having a high melting point, low thermal conductivity and negligible electrical conductivity, such as mica. The core layer 30 of steel ensures that the relatively fragile mica is not separated by the pressure of a flame jet. The outer layers 32 of mica ensure that local heat is insufficient to cause damage to the core layer 30, and additionally maintain electrical isolation before and after a thermal event. Additionally, the first laminate 26 may also include a flame-retardant material, which is highly thermally conductive in the plane direction, or very low thermally conductive in the thickness direction vertical to the plane direction.

Alternatively, the core layer 30 may be a sheet of paper heavily doped with a flame-retardant material, and the outer layers 32 may be coatings of the flame-retardant material that completely seal the sheet of paper therebetween. The sheet of paper provides flexibility and the basic strength for the first laminate 26. The flame-retardant material protects the sheet of paper against heat or fire.

Alternatively, the core layer 30 may be a carbon fiber woven with a flame-retardant resin, and the outer layers 32 may be a dielectric coating. The carbon fiber in the core layer 30 is highly thermally conductive and can quickly distribute local heat to other parts of the lamination to avoid damage to the lamination by local heat. The weave of the carbon fiber provides the required mechanical strength for the lamination. The flame-retardant resin in the core layer 30 covers all the holes in the weave to ensure that no flame jet would go through the holes in the weave to impact a neighboring battery cell. The dielectric coating of the outer layers 32 prevents electrical shorts from occurring between the battery cells 12 and the first laminate 26.

The second laminate 28 includes a pair of the first laminates 26 and an adhesive section 34 therebetween. The adhesive section 34 may be a flame-retardant adhesive. Therefore, the second laminate 28 includes two core layers 30, two pairs of outer layers 32 on opposing surfaces of the core layers 30, and an adhesive section 34 in the middle.

Figure 4:
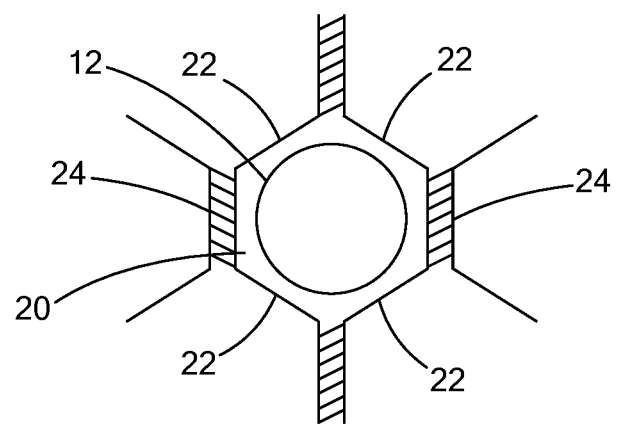
FIG. 4 is a schematic top view of a cell unit of a separating member having a honeycomb configuration constructed in accordance with the teachings of the present disclosure.

Referring to FIG. 4, the unit cell of the honeycomb structure of the separating member 14 is defined by four first walls 22 having the first laminate 26 and two second walls 24 having the second laminate 28. The battery cell 12 is disposed in the cavity 20 of the unit cell. The unit cell may be configured to allow an air gap to be formed or not to be formed between the the battery cell 12 and each of the first and second walls 22, 24. In either case, air space is provided between the corners of the six-sided cavity 20 and the cylindrical battery cell 12 to provide venting pathways toward the ends of the battery cells and the ends of the separating member 14 during a thermal runaway event.

In the event of a side rupture occurring in a particular cell 12, the first walls 22 having the first laminate 26 and the second walls 22 having the second laminate 28 can withstand the blowtorch effect. The hot gas vented from the particular cell 12 is thus directed to the lowest-impedance path, i.e., toward either ends of the cell 12. Therefore, the vented gas is directed away from the neighboring cells 12 to reduce the likelihood of thermal runaway propagation.

Referring to FIGS. 5A and 5B, the separating member 14 can be relatively easily manufactured by forming a third laminated structure 40 in a substantially plate configuration (in a collapsed state) as shown in FIG. 5A, followed by expanding the third laminated structure 40 into a honeycomb structure (in an expanded state) as shown in FIG. 5B.

More specifically, to manufacture the separating member 14, a plurality of material layers 42 are placed on top of another and are separated and bonded by a plurality of adhesive sections 34 to form the third laminated structure 40. In the drawings, the material layers 42 and the adhesive sections 34 are not drawn to scale and the thickness of the adhesive sections 34 is exaggerated for the purpose of showing their locations and length. The material layers 42 may each have a first laminate 26 as shown in FIG. 2. The adhesive sections 34 are the same adhesive section 34 shown in the second laminate 28 as shown in FIG. 3.

The plurality of adhesive sections 34 are provided between adjacent ones of the material layers 42. The plurality of adhesive sections 34 between the same material layers 42 (i.e., in the same row or in the same layer) are spaced apart at a predetermined interval to define a plurality of cavities 44 therebetween. When the third laminated structure 40 is in the collapsed state and has substantially the plate configuration, the plurality of cavities 44 have a rectangular shape, each having a length that is approximately three times the length of each of the adhesive sections 34.

The adhesive sections 34 and the cavities 44 in one row or layer are offset from those of an adjacent row or layer such that the locations of the adhesive sections 34 in one row are 180 degrees out of phase relative to the locations of the adhesive sections 34 in the adjacent rows. As a result, the adhesive sections 34 in every other rows are aligned along the thickness direction of the third laminated structure 40.

The interval of the adhesive sections 34, the length of the adhesive sections 34, and consequently the length of the cavities 44 in one row are selected based on the size of the unit cells of the honeycomb structure to be formed in the expanded state. As previously described, the unit cells of the honeycomb structure each are formed by four first walls 22 and two second walls 24. Each of the adhesive sections 34 in the third laminated structure 40 has a length substantially equal to the length of the first and second walls 22 and 24.

Referring to FIG. 5B, by expanding the third laminated structure 40 of FIG. 5A, a honeycomb structure is thus formed. In the expanded state, the material layers 42 are bent at ends of the adhesive sections 34, thereby expanding the cavities 44 from rectangular shapes into hexagonal shapes. The portions of the material layers 42 not in direct contact with the adhesive sections 34 become the first walls 22 of the honeycomb structure of the separating member 14 in the expanded state. The portions of the materials layers 42 in direct contact with the adhesive sections 34 become a part of the second walls 24 of the honeycomb structure of the separating member 14 in the expanded state. As previously described, the second walls 24 have a second laminate 28 including a pair of first laminates 26 bonded by the adhesive section 34. The pair of the first laminates 26 are the portions of the adjacent material layers 42 in direct contact with and opposing the same adhesive section 34. The material layers 42 may be corrugated before being laminated to facilitate bending and expanding of the third laminated structure 40 from the plate configuration into a honeycomb configuration.

Figure 6A:
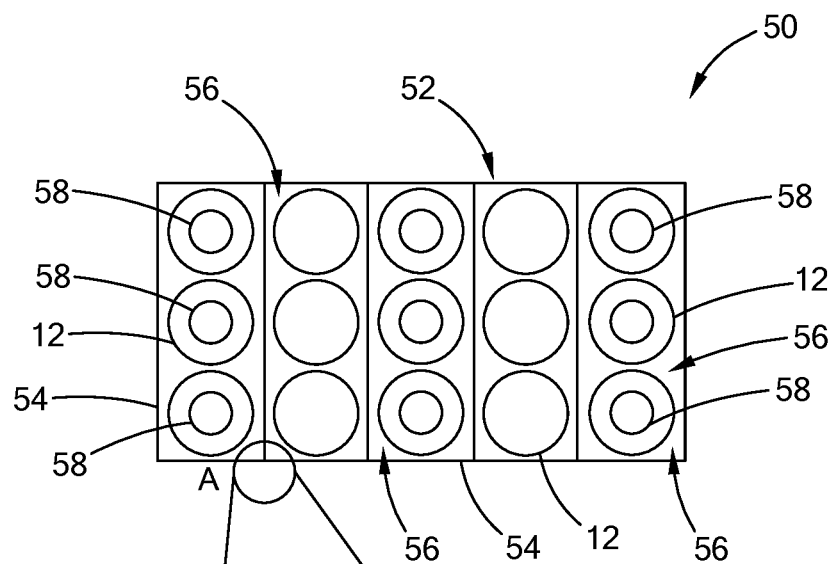
FIG. 6A is a schematic top view of a variant of a battery pack including a plurality of battery cells and a separating member for separating the individual battery cells constructed in accordance with the teachings of the present disclosure.
Figure 6B:
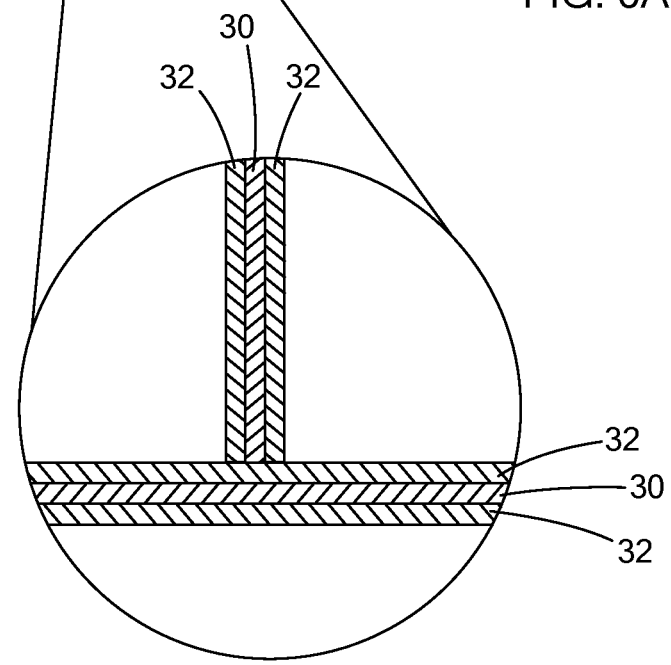
FIG. 6B is an enlarged view of portion A of FIG. 6A.

Referring to FIGS. 6A and 6B, a variant of a battery pack 50 constructed in accordance with the teachings of the present disclosure includes a plurality of battery cells 12 and a separating member 52. The separating member 52 includes a plurality of walls 54 defining a plurality of cavities 56. The plurality of battery cells 12 form a plurality of groups, each group being received in each one of the cavities 56. While FIG. 6A shows three battery cells 12 are arranged to form a group and received in one of the cavities 56, which have a rectangular shape, it is understood that the cavities 56 can have any shape and any number of battery cells 12 can form one group without departing from the scope of the present disclosure. The battery cells 12 in the plurality of groups may be oriented to have positive terminals 58 pointing to the same direction or in opposite directions.

Referring to FIG. 6B, the plurality of walls 54 of the separating members 52 can have a laminated structure similar to that described in connection with FIG. 2. Generally, the laminated structure includes a flame-retardant material having a low dielectric constant. In one form, each wall 54 may include a core layer 30 made of metal having high melting point and high strength, such as steel, and outer layers 32 made of mica on opposing surfaces of the core layer 30. In another form, the core layer 30 may be a sheet of paper highly doped with a flame-resistant resin and the outer layers 32 may include a flame-resistant resin. In still another form, the core layer 30 may be a carbon fiber woven with a flame-retardant resin, and the outer layers 32 are dielectric coatings.

The separating members 14, 52 constructed in accordance with the teachings of the present disclosure can effectively reduce thermal runaway propagation through side split by using laminated structures. The separating member 14 for a close-hexagonal packed array of cylinder battery cells 12 has a honeycomb structure, which can be relatively easily manufactured by first forming a laminated structure, followed by expanding the laminated structure into a honeycomb structure, thereby providing a low-cost barrier between adjacent battery cells 12. The resulting honeycomb structure is lightweight and provides improved protection for the battery cells 12 to reduce the impact of thermal runaways that occur with side rupture.

The separating member 52 for a relatively loosely-packed battery array such as that shown in FIG. 6A includes a plurality of walls 54 defining a plurality of cavities 56 for receiving a plurality groups of battery cells 12. Each cavity 56 receives one group of battery cells 12. While no divider or separator is provided between adjacent battery cells in the same group, a thermal runaway event in one group of battery cells 12 is prevented from propagating to another group of cells due to the presence of the walls 54 which has a laminate structure to effectively prevent the thermal runaway propagation.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A separating member for separating a plurality of battery cells, the separating member comprising:
    a plurality of first walls; and
    a plurality of second walls having a thickness larger than a thickness of the first walls,
    wherein the plurality of first and second walls each include a laminated structure,
    wherein the separating member is expandable from a collapsed state to an expanded state, the separating member having a plate configuration with the first walls being disposed parallel to the second walls in the collapsed state and having a honeycomb structure including a plurality of unit cells with the first walls being disposed at angles to the second walls in the expanded state, and
    wherein the plurality of first walls and the plurality of second walls jointly define the plurality of cell units of the honeycomb structure with an end of each of the first walls coupled to an end of one of the second walls.

2. The separating member according to claim 1, wherein the first walls each include a first laminate, and the second walls each include a pair of the first laminates and an adhesive section therebetween.

3. The separating member according to claim 2, wherein the first laminate includes a core layer and a pair of outer layers on opposing surfaces of the core layer.

4. The separating member according to claim 3, wherein the core layer includes a layer chosen from a metal sheet, a sheet of paper, and a carbon fiber woven by a flame-retardant resin.

5. The separating member according to claim 3, wherein the outer layers are made from a material that includes a material chosen from mica, a flame-retardant resin, and a dielectric material.

6. The separating member according to claim 1, wherein each of the unit cells of the honeycomb structure has a hexagonal cross section and is defined by four of the first walls and two of the second walls.

7. The separating member according to claim 6, wherein the plurality of second walls are parallel to each other in the honeycomb structure.

8. The separating member according to claim 6, wherein adjacent ones of the first walls define an angle of 120 degrees in the honeycomb structure.

* * * * *